March 28, 1950  O. E. ROSEN  2,502,234
CONTROL FOR HYDRAULIC MOTORS
Filed Oct. 16, 1944  2 Sheets-Sheet 2
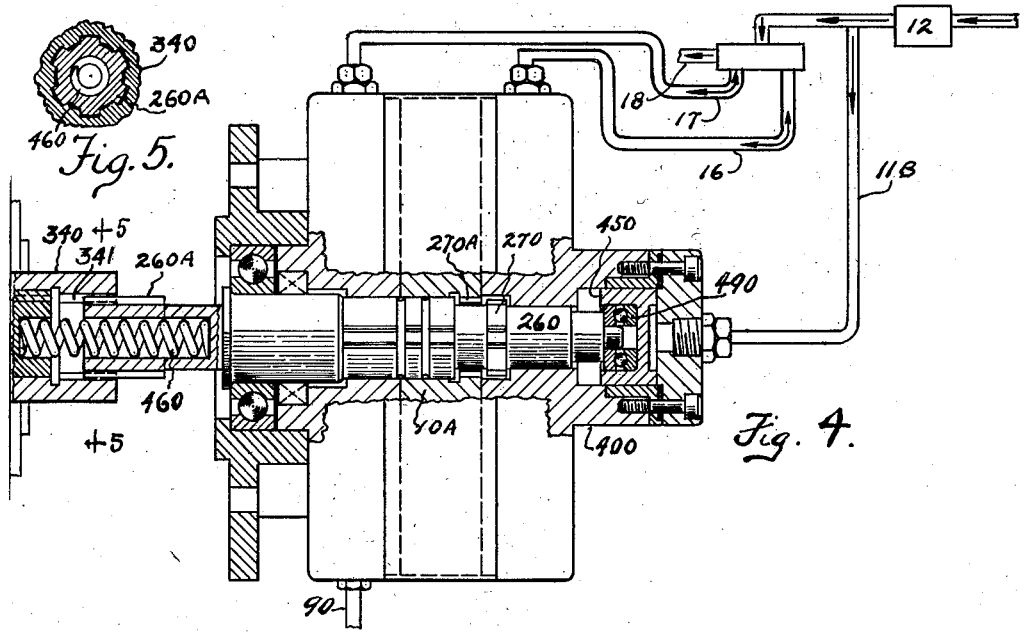
Fig. 5.
Fig. 4.
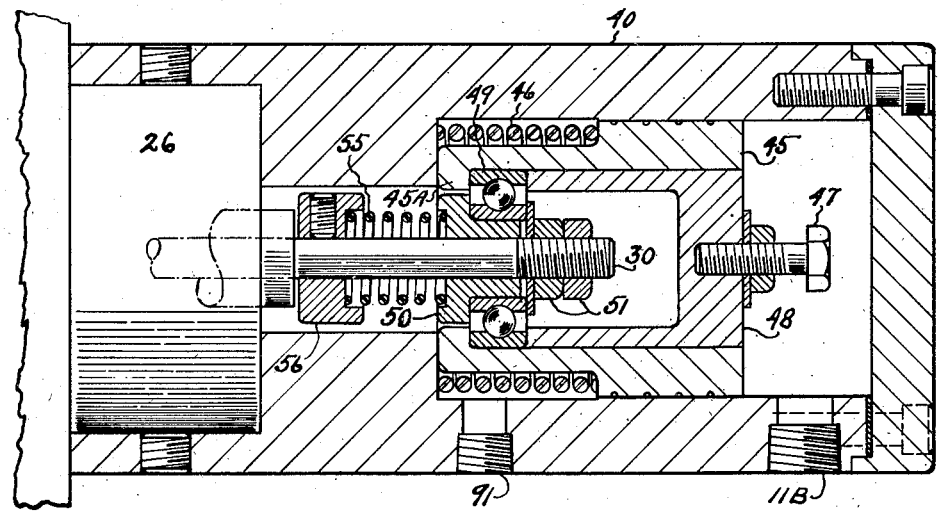
Fig. 2.
INVENTOR.
Oscar E. Rosen
BY Swan Frye & Hardesty
Attys.

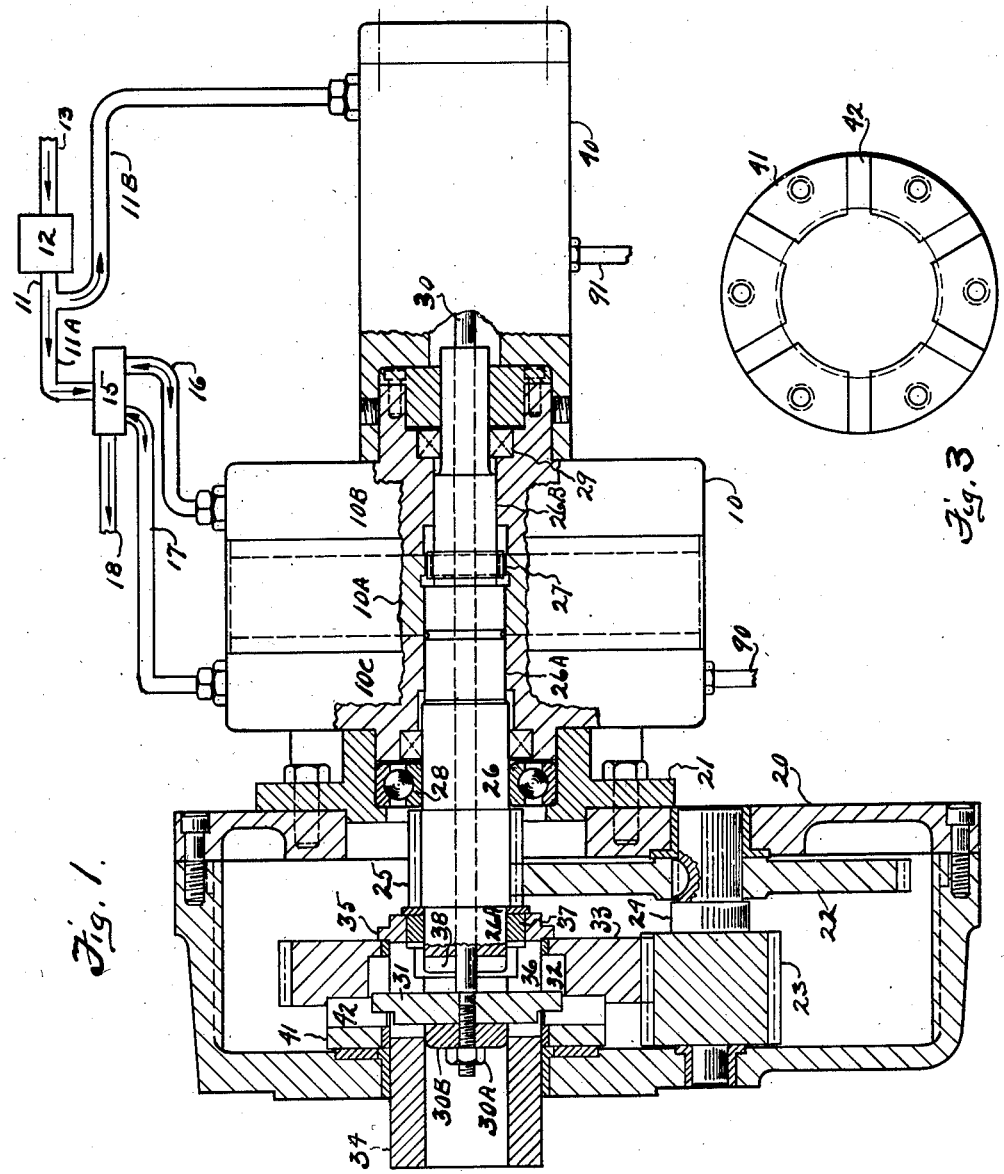

Patented Mar. 28, 1950

2,502,234

UNITED STATES PATENT OFFICE 2,502,234

CONTROL FOR HYDRAULIC MOTORS

Oscar E. Rosen, Detroit, Mich., assignor to The Lodge and Shipley Company, Cincinnati, Ohio, a corporation of Ohio Application October 16, 1944, Serial No. 558,825

2 Claims. (Cl. 192—.07)

The present invention relates to controls for hydraulic motors and specifically to means for preventing the overrun of devices being driven thereby.

In the use of hydraulic motors for the drive of many devices such as machine tools, duplicating and die sinking machines and the like, it is often desirable and sometimes necessary to have the driven machine come to rest instantaneously, as soon as the supply of power to the motor is shut off. However, because of the inertia of the rotor of the motor, it frequently happens that the latter continues for a fraction of a revolution so that the driven machine continues to move beyond the point at which the operator intended it to stop.

Among the objects of the present invention is to overcome this difficulty and prevent any effect on the driven machine by any overrun of the motor.

Another object is means to disconnect the motor instantaneously from the driven device or machine as soon as the supply of motive fluid to the motor is discontinued.

Another object is a fluid actuated clutch, between the motor and driven device, actuated to connect or disconnect the two by the presence or absence of pressure in the motor supply line.

Other objects and advantages will be apparent to those skilled in the art upon reference to the following description and the accompanying drawings in which:

Figure 1 is a side elevation, partially in vertical longitudinal section, of the motor, reducing gearing and clutch.

Figure 2 is a longitudinal control sectional view of the clutch operating means.

Figure 3 is a view in elevation of one of the clutch elements.

Figure 4 shows a modification, partially in section.

Figure 5 is a section on line 5—5 of Figure 4.

In the drawings, there is shown at 10 a reversible rotary hydraulic motor which may be of any suitable construction but is preferably of the type shown in my copending application Serial No. 424,732, filed December 29, 1941, now Patent No. 2,393,223, on Hydraulic motors, this being a movable vane type motor.

The rotor of such motor is indicated at 10A between two chests 10B and 10C, the latter acting alternately as supply and exhaust of fluid in operating the motor. The fluid supply line is shown at 11 as connected to a suitable pump, indicated conventionally at 12, drawing fluid through conduit 13 from a suitable source of supply (not shown).

The conduit 11 is divided into two branches 11A and 11B, the former leading to a valve mechanism, indicated conventionally at 15, from which lead three conduits 16, 17 and 18, the latter being an exhaust conduit leading back to the source of supply.

By means of the valve mechanism 15, one of the conduits 16 and 17 may be opened to the pressure fluid from conduit 11A and at the same time the other of the two is connected to conduit 18. As this is done, fluid under pressure passes, for example, into chest 10B, through rotor 10A into chest 10C and out through conduit 17 to conduit 18. This will produce rotation of the rotor in one direction. A reversal of flow through conduit 17, chest 10C, the rotor 10A, chest 10B, conduit 16 and conduit 18 will produce rotation of the rotor 10A in the reverse direction.

As shown in Figure 1, the motor 10 has secured thereto at one end a gear reduction unit 20 and at the other end a pressure cylinder 40 which will be described later.

The gear reduction 20 consists of a housing fixed to the motor 10 by bolting to a flange 21 and containing a suitable idler gear cluster consisting of a large gear 22 and a small one 23 fixed to the same shaft 24. The gear 22 is in constant mesh with the small gear 25 carried by or forming a part of shaft 26 which extends from the housing 20 into and through the motor being mounted in bearings 26A and 26B in the two chests 10C and 10B, respectively, and splined to the rotor 10A as indicated at 27. The shaft 26 is mounted in a suitable antifriction bearing 28 where it emerges from the housing 20 and at its other end passes through suitable packings 29.

Extending into housing 20 in axial alignment with shaft 26 is a short hollow shaft 34, provided near its inner end with a flange 35, serving to maintain the shaft against outward movement when the parts are assembled, and also provided with a through slot 36 through which passes a key 31 movable longitudinally of the slot.

As is shown, the end 26A of shaft 26 extends into the opening in shaft 34, a suitable bearing 37 being provided therein, and is cross slotted as at 38 to receive the key 31 when the latter is moved toward the right (Fig. 1).

This key 31 is carried on a rod 30 which extends lengthwise through shaft 26 and into the cylinder 40. The key 31 is preferably secured to the end of rod 30 by nut 30A which also fixes in a short pilot element 30B.

Loosely mounted on shaft 34 is a gear 33 in constant mesh relation with gear 23 and provided with a circular recess 32 adapted to receive the ends of key 31 when the latter is moved to the right (Fig. 1). And fixed to the face of gear 33 over the recess is a disc 41 provided with radial slots 42 into which the key 31 may move from the recess 32.

From the foregoing, it will be seen that the motor drive is through shaft 26, gear 25, gear 22, gear 23, and gear 33 which latter, through disc 41 and the key 31 in slot 36, drives the shaft 34 when the key 31 is in the slots 42. When, however, the key is moved out of slots 42 and into the recess 32, the gear 33 and disc 41 may rotate free of the shaft 34.

Shaft 34, incidentally, may be, and preferably is, used as a means to which the driven device is coupled by suitable means not shown.

At the other side of the motor 10 is fixed the means for automatic operation of the key 31. This consists of a cylinder 40 (see Fig. 2) containing a piston 45 connected to rod 30 and biased toward the outer end of the cylinder by a strong spring 46, the outward movement being limited by the adjustable stop 47.

This piston 45 consists of an outer cylindrical shell open at both ends but provided with a flange 45A, and an axial plug member 48 which is held within the shell in any suitable fashion and serves to hold a suitable antifriction bearing 49 between its inner end and the flange 45A.

In the bearing 49 is mounted an axially bored plug member 50, the rod 30 extending therethrough and fixed against outward relative movement by means of suitable nuts 51, so that the spring 46 tends at all times to move the rod 30, and therewith the key 31, into the recess 32 in gear 33 and out of the slots 42 in disc 41.

The rod 30 is resiliently held against movement inward of the piston 45 by means of the spring 55 acting between a stop member 56 and the outer end of plug 50. The piston, therefore, may move to compress spring 46 although movement of the rod 30 may be opposed by the failure of key 31 to go immediately into a slot 42.

It will be clear from the foregoing that as the fluid from pump 12 is forced under pressure into either side of the motor 10, it will, at the same time, be forced into the cylinder 40 and move the piston 45, and with it the rod 30 and key 31, to cause engagement of the latter with disc 41, i. e., clutch engagement.

As soon, however, as the pressure in the line 11 is discontinued, the spring 46 immediately causes the opposite movement of the parts and therefore, clutch disengagement.

In Figure 4 is shown a modified form of the device, in which the entire motor shaft is moved to engage and disengage the clutch. In this figure the motor 10 may be identical with that shown in Figure 1 in which the splines 27 fixing the rotor and shaft are quite short. Likewise the fluid supply conduits are identical the pump 12 supplying fluid under pressure to conduit 11B and to one or the other of conduits 16 and 17 while the fluid outflow from the motor is through conduit 18. Likewise fluid in conduit 11B flows into the clutch actuating cylinder 400. However, in this form of the device, the piston 450 is carried on the end of motor shaft 260, with the interposition of a thrust bearing 490, and when pressure is applied, moves the shaft 260 toward the left (Figure 4) to move the splines 270 into engagement with mating splines 270A carried by the motor rotor 10A.

This figure illustrates a motor directly coupled with a driven device having an extending hollow shaft 340, internally splined, as at 341, to coact with the splined end 260A of the motor shaft, the latter being also hollow and acting as a guide and container for a spring 460. This spring 460 resists the action of piston 450 and moves the shaft to disengage the splines 270 when the pressure in the cylinder 400 is relieved. The conduits 90 and 91 serve to drain off any fluid leaking past the working parts of the motor and pressure cylinder respectively.

Now having described the invention and the preferred embodiment thereof, it is to be understood that the invention is to be limited, not to the specific details herein set forth, but only by the scope of the claims which follow.

I claim:

1. A hydraulic motor of the rotary type having a casing and having its drive shaft extending from both sides of said casing, a gear reduction unit at one side of said casing and connected to one end of said shaft, a power output shaft extending from said unit in alignment with said drive shaft, said output shaft being slotted to receive a key movable longitudinally thereof, a driven gear in said unit and provided with radial slots into which said key may be moved whereby to connect said gear and output shaft in driving relation, a cylinder mounted in the other side of said casing and having therein a piston, means extending axially of said drive shaft and connecting said piston to said key, spring means for moving said piston in a direction to move said key from said radial slots, means for supplying pressure fluid to said motor and means for simultaneously supplying pressure-fluid to said cylinder whereby to move said piston and key to cause the latter to engage said radial slots.

2. A hydraulic motor of the rotary type having a casing and having its drive shaft extending from both sides of said casing, a power output shaft on one side of said casing in alignment with said drive shaft, said output shaft being slotted to receive a key movable longitudinally thereof, a disc coaxial with said drive shaft, a driving connection between said drive shaft and said disc, said disc being provided with radial slots into which said key can be moved to connect said disc and said output shaft in driving relation, a rod extending axially of and through said drive shaft and connected to said key, spring means adapted to urge said key out of said radial slots, a cylinder mounted in the other side of said casing and having therein a piston connected to said rod, means for supplying pressure fluid to said motor, and means for simultaneously supplying pressure fluid to said cylinder, whereby to move said piston and key to cause the latter to engage said radial slots.

OSCAR E. ROSEN.

REFERENCES CITED

The following references are of record in the file of this patent:

UNITED STATES PATENTS

| Number | Name | Date |
| --- | --- | --- |
| 1,102,410 | Jacoby | July 7, 1914 |
| 1,154,149 | Weston | Sept. 21, 1915 |
| 2,081,760 | Nardone | May 25, 1937 |

FOREIGN PATENTS

| Number | Country | Date |
| --- | --- | --- |
| 420,102 | Great Britain | Nov. 26, 1934 |
| 387,399 | Great Britain | Feb. 9, 1933 |